Figure 1:
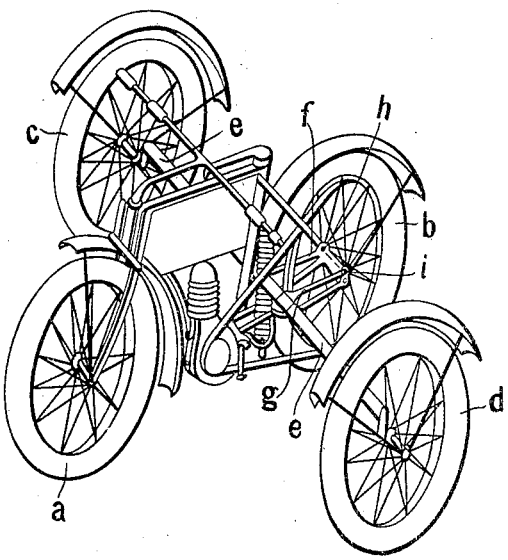

No. 854,432.  
PATENTED MAY 21, 1907.  
G. ROTHGIESSER.  
MOTOR VEHICLE.  
APPLICATION FILED FEB. 8, 1907.

2 SHEETS—SHEET 1.

Witnesses:

Inventor
Georg Rothgiesser;
By his Attorney

No. 854,432.

PATENTED MAY 21, 1907.

G. ROTHGIESSER.
MOTOR VEHICLE.
APPLICATION FILED FEB. 8, 1907.

2 SHEETS—SHEET 2.

UNITED STATES PATENT OFFICE.

GEORG ROTHGIESSER, OF BERLIN, GERMANY.

MOTOR-VEHICLE.

No. 854,432.　　　　Specification of Letters Patent.　　　　Patented May 21, 1907.

Application filed February 8, 1907. Serial No. 356,312.

*To all whom it may concern:*

Be it known that I, GEORG ROTHGIESSER, a citizen of the German Empire, residing at Berlin, in the Kingdom of Prussia, Germany, have invented certain new and useful Improvements in Motor-Vehicles, of which the following is a specification.

The present invention refers to a motor vehicle, consisting of a motor bicycle, from which the saddle is removed connected to the motor bicycle and having a wheel and a seat on either side of the bicycle.

By this invention the advantages, of a motor bicycle (cheapness, easy attendance, simplicity) are combined with the advantages of a motor car (convenient seating, steadiness and the like). When compared with a motor car or a motor bicycle the present combination has the advantage that the steering and the attendance of the motor can be at any time done by two persons, seated on the right and the left side of the motor and having the handle bar in front of them, which feature may be of importance in case of danger.

The new vehicle consists essentially and preferably of a motor bicycle, the saddle of which is removed and the handle bar of which is replaced by a modified one; further of a horizontal cross beam carrying the elastically supported seats, said cross beam passing clear through the bicycle frame and carrying at both ends on the right and left a wheel, which can move quite independently of each other. This cross beam has toward it back on either side a brace, which is pivoted to the frame of the bicycle near to the axle of the back wheel in such a manner (Fig. 2) that the cross beam can oscillate around an axis which lies near and parallel to the axle of the back wheel. Instead of being directed backward the said braces may also be directed forward and be pivoted in a similar manner to the front part of the bicycle frame.

As the center of gravity of the whole system lies about in the plane in the middle between the two side wheels, the thus constructed vehicle affords a certain safety against upsetting when turning curves even if only one of the seats is occupied.

In order to provide the driving wheel (the back wheel of the bicycle) with a sufficient adhesion weight, an elastically supported adjustable device is provided between cross beam and bicycle frame, which allows of letting the load have more or less effect on the back wheel or on the two side wheels, in such a manner, that by a simple manipulation it is possible to free the back wheel from all load and so allow of starting the motor when the vehicle is standing still.

The new arrangement represents consequently in principle a trailer with two seats moved more forward, which however by the seats being next to the motor bicycle allows of steering the bicycle and attending the motor from either seat of the trailer.

Figure 2:
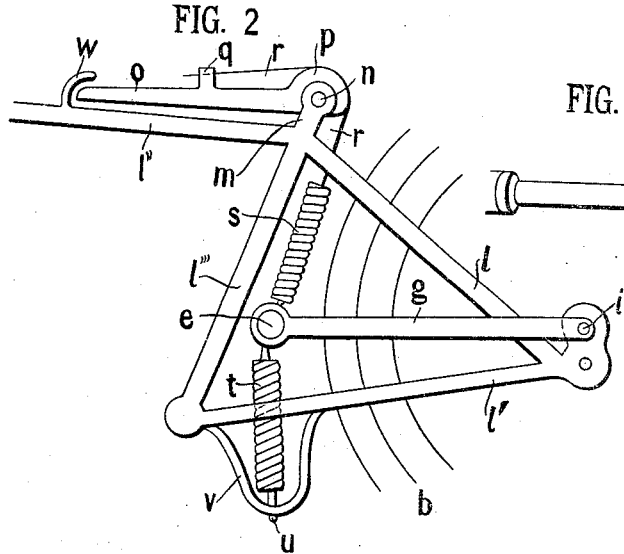
Figure 3:
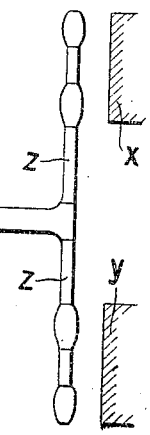
Figure 4:
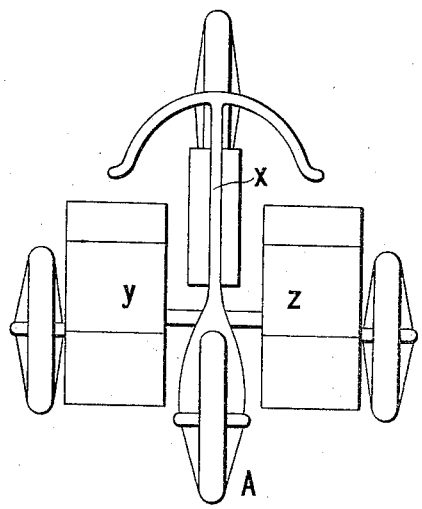

In the accompanying drawings Figures 1, 2 and 3 illustrate a construction of the invention in its details, Fig. 1 being a perspective total view of the vehicle, the seats having been removed, Figs. 2 and 3 show details. Fig. 4 is a diagrammatic plan, in which —$x$— is the frame of the motor bicycle, —$y$— and —$z$— are the two seats.

In the drawings, in Fig. 1, —$a$— is the front wheel of the bicycle, —$b$— the back wheel, —$c$— is the right side wheel, —$d$— is the left side wheel, —$e$— is the cross beam, —$f$— and —$g$— are the horizontal braces attached with the cross beam and connected at —$h$— and —$i$— with the frame.

In Fig. 2 the arrangement for adjusting the cross beam with relation to the bicycle is shown separately. —$b$— is the back wheel of the bicycle, $l$, $l'$, $l''$, $l'''$ are parts of the bicycle frame. Instead of the saddle bracket part —$m$— is provided, which carries a horizontal axis —$n$— around which the lever —$o$— turns. This lever has near to its pivot a disk shaped enlargement —$p$— and a lug —$q$—, in which the end of a wire rope —$r$— is adjustably secured. This wire rope lies in a groove in the rim of disk —$p$— and is secured with its other end to a spring —$s$— which works on the cross beam. On the latter works also a second spring —$t$— which is secured by an adjustable screw —$u$— to the strap —$v$— provided on frame part —$l$—. The front end of the lever —$o$— is held by the catch —$w$— provided on frame $l''$.

The arrangement operates in such a manner, that by varying the tension of the upper spring —$s$— by means of rope —$r$—, the cross beam —$e$— is raised or lowered respectively, which effects a variation of the load on the two side wheels as compared with the back wheel. Therefore the load can be transferred at will more on the side wheels or on the back wheel. If by releasing the catch —$w$— the lever —$o$— is entirely released, so that spring —s— effects no more upward pull on the cross beam —e— the back wheel —b— will be entirely free of all load, as now spring —t— will raise strap —v— and therewith the frame of the bicycle. The back portion of the bicycle then rests on the two side wheels, while the driving wheel is raised. In this position the motor can be started, while the vehicle is standing still; this can be done in the usual manner by using one of the two pedal cranks as starting crank, and the vehicle can be conveniently made to start by gradually lowering the lever —o— and thereby increasing the pressure of the back wheel on the ground.

The form of the handle bar is preferably made as shown in Fig. 3, in plan view, so that from both the right and left seat — x— and —y— respectively the handle can be seized.

Having now described my invention what I claim and desire to secure by Letters Patent of the United States is:

1. In a motor vehicle the combination of a motor bicycle with a frame having on each side of the motor bicycle a runner wheel and a seat, which seats are arranged as close to the motor bicycle as possible, so that the motor and steering gear can be operated and attended from both seats.

2. In a motor vehicle the combination of a motor bicycle with a frame having on each side of the motor bicycle a runner wheel, said frame consisting of a cross-beam passing clear crosswise through the frame of the bicycle, and seats on said cross beam arranged as close as possible to the motor bicycle.

3. In a motor vehicle the combination of a motor bicycle with a frame having on each side of the motor bicycle a runner wheel, said frame consisting of a cross-beam passing clear crosswise through the frame of the bicycle, seats on said cross bar, and a horizontal axis on the frame of the bicycle to which the cross beam is pivoted.

4. In a motor vehicle the combination of a motor bicycle with a frame having on each side of the motor bicycle a runner wheel and a seat, between the frame of the bicycle and the frame of the runner wheels, said runner wheel frame consists of a cross beam, and an elastic device mounted between the cross beam and the bicycle frame to adjust the load on the rear wheel.

5. In a motor vehicle the combination of a motor bicycle with a frame having on each side of the motor bicycle a runner wheel, said frame consisting of a pivotally arranged cross beam passing clear through the frame of the bicycle, and an elastic device for adjusting the load on the rear wheel consisting of a rope and two springs so arranged that by pulling or releasing said rope the cross beam is raised or lowered.

In testimony whereof I affix my signature in presence of two witnesses.

GEORG ROTHGIESSER.

Witnesses:
WOLDEMAR HAUPT.
HENRY HASPER.